G. F. FOSS.
AUTOMOBILE FLOOR MAT.
APPLICATION FILED JULY 26, 1915.

1,193,250. Patented Aug. 1, 1916.

Witnesses

Inventor
G. F. Foss

UNITED STATES PATENT OFFICE.

GEORGE F. FOSS, OF MONTREAL, QUEBEC, CANADA.

AUTOMOBILE FLOOR-MAT.

1,193,250.  Specification of Letters Patent.  Patented Aug. 1, 1916.

Application filed July 26, 1915. Serial No. 42,105.

*To all whom it may concern:*

Be it known that I, GEORGE F. FOSS, a citizen of the Dominion of Canada, and resident of the city of Montreal, in the Province of Quebec and Dominion of Canada, have invented certain new and useful Improvements in Automobile Floor-Mats, of which the following is a full, clear, and exact description.

This invention relates to improvements in floor mats for automobiles, and the object of the invention is to provide a simple, durable and inexpensive means for preventing the entrance of hot or cold air, dust, and noise through the slots formed in the floor of the car for the passage of the pedals.

At the present time, in the great majority of automobiles, one or more of the pedals are of oscillating type and therefore require a slot of considerable length be formed in the floor, through which they may operate. In warm weather, hot air blown back by the circulating fan rushes up through these slots and is frequently accompanied by a steady shower of dust. In winter, cold air blows up through these slots to the great discomfort of the driver, and at all times the slots permit the entrance of engine noises to the body of the car. It is obvious that the degree of discomfort under the various heads enumerated varies with the make of car, and in some few makes does not exist, as the pedals are arranged to run straight down.

This invention consists in providing a floor mat having a highly elastic insert provided with reinforced apertures for the passage of the pedals. When the pedals are operated, the elastic insert yields, but at all times keeps the slots of the floor closed to air, dust and noise.

Figure 1:
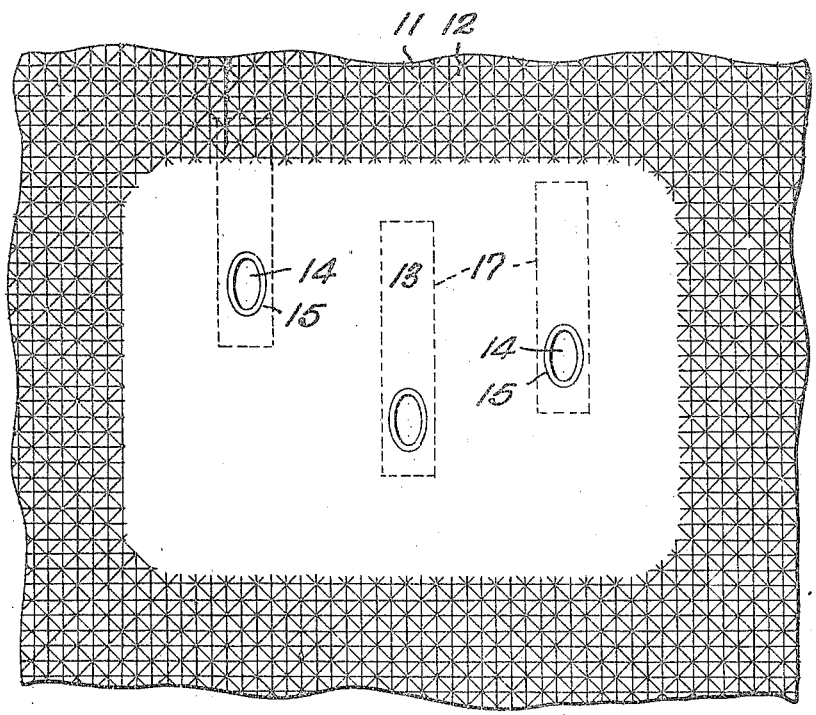
Figure 2:
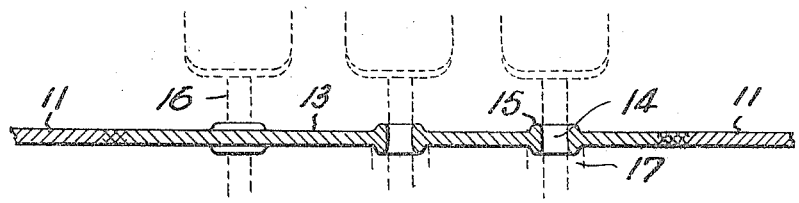

In the drawings which illustrate the invention:—Figure 1 is a partial plan view of a floor mat formed according to this invention. Fig. 2 is a section on the line 2—2, Fig. 1.

Referring more particularly to the drawings, 11 designates a mat of any suitable size and shape formed of rubber or suitable material, having the surface plain or checkered or corrugated, as at 12, to provide secure footing. An insert 13 of highly elastic rubber or other material is provided in the mat adjacent the pedals, and is provided with a suitable number of apertures 14 for the passage of the pedals. The edges of the insert around the apertures are heavily reinforced as by thickening the rubber, as shown at 15. When the mat is placed in position, the elastic insert will stretch sufficiently to permit passing the pedals through the apertures, but the material will then close up tightly around the shanks 16 of the pedals, so that the pedal slots 17 in the floor will be completely closed and hot or cold air, dust, and noise prevented from entering the body of the car.

When the pedals are operated, the highly elastic insert merely stretches without materially increasing the resistance of the pedal, and at the same time maintains the floor slot closed.

Having thus described my invention, what I claim is:—

1. In an automobile floor mat, a body of substantially inelastic material, a highly elastic insert apertured for the passage of pedals, and reinforcement for said insert around the apertures.

2. In an automobile floor mat, a body of substantially inelastic material, an insert of highly elastic material apertured for the passage of pedals, and reinforcement for said insert around the edges of said apertures arranged to maintain a close connection with the pedals.

3. In a device of the character described, an apertured sheet of highly elastic material, the apertures thereof being positioned for the passage of movable members, and the body of the sheet being arranged to cover the path of said movable members, and means for reinforcing the sheet around apertures and for holding the sheet securely to the movable members.

In witness whereof, I have hereunto set my hand, in presence of two witnesses.

GEORGE F. FOSS.

Witnesses:
S. K. W. ALLEN,
G. M. MORELAND.